Orange & Beidelman.
Revolving Harrow.

Nº 21,439.

Patented Sept. 7, 1858.

UNITED STATES PATENT OFFICE.

SAMUEL J. ORANGE AND GEORGE BEIDELMAN, OF GRAYVILLE, ILLINOIS.

IMPROVEMENT IN HARROWS.

Specification forming part of Letters Patent No. 21,439, dated September 7, 1858.

*To all whom it may concern:*

Be it known that we, SAMUEL J. ORANGE and GEORGE BEIDELMAN, of Grayville, in the county of White and State of Illinois, have invented certain new and useful Improvements in Harrows, the construction and operation of which we have described in the following specification and illustrated in the accompanying drawings with sufficient clearness to enable competent and skillful workmen in the arts to which it pertains or is most nearly allied to make and use our invention.

Our said invention consists in the combination of the handles with a double set of rollers and a circular frame, by which we are able, by a pressure upon both or either one of the handles, to guide or rotate the harrow in either direction with facility and ease.

Our harrow is chiefly designed for cultivating crops which are planted in rows—such as corn, potatoes, and the like—and by the peculiar combination of its parts, as hereinafter described, we are enabled with but little exertion to guide it in the direction of the draft, or cause it to pass around the hills, if within the row, or any other obstacle which may chance to be in the way.

Figure 1:
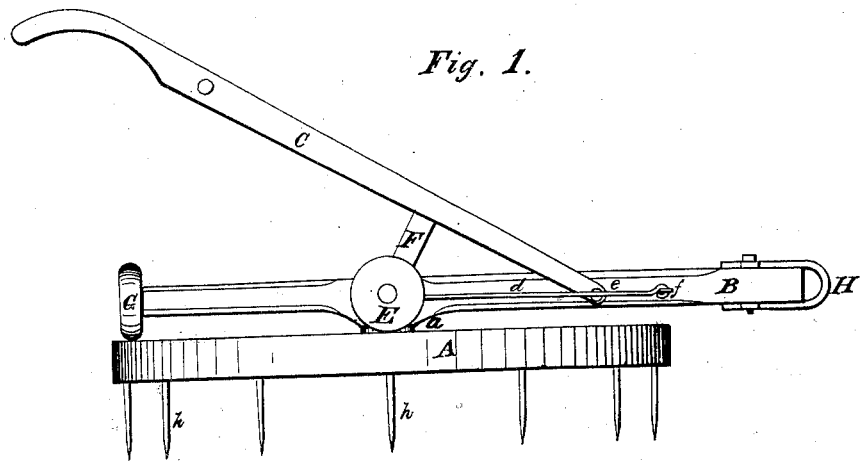
Figure 2:
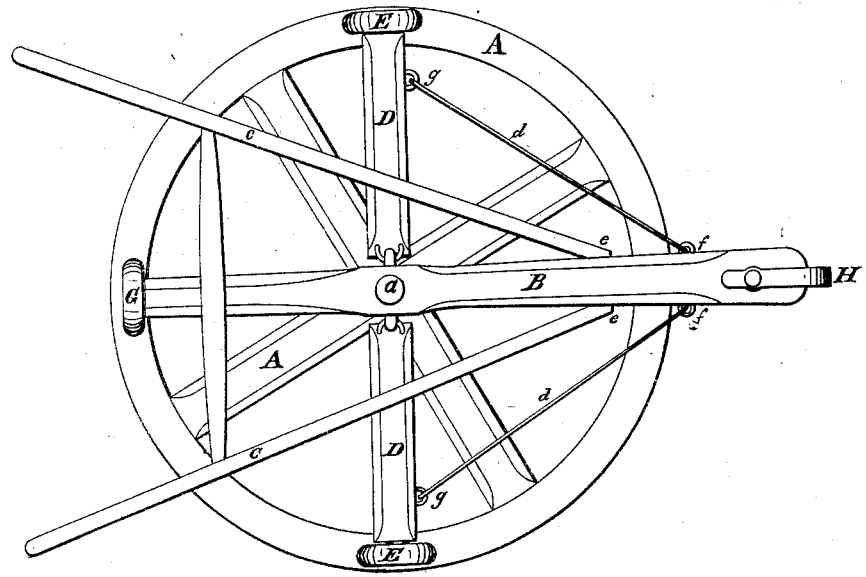

In the accompanying drawings, Figure 1 is an elevation of the harrow; Fig. 2, a plan of it.

A A is the frame of the harrow, made in a circular form, and pivoted at *a*, the center pin upon which the harrow turns.

B is the draft-beam, connected to the harrow by center pin, *a*.

C C are the handles, attached at *e* to the draft-beam B, so as to admit of a slight vertical vibration.

D D are transverse beams hinged to draft-beam B at each side, directly opposite the center pin, *a*. They have rollers E E at their outer extremities, which rollers rest upon the rim A.

The braces F (seen in Fig. 1) serve as supports to the handles, and are the means by which the pressure is communicated to the transverse beams D D, thence to rim A through rolls E E. The transverse beams D D are also supported in their relative position and prevented from drawing back by the braces *d d*, hinged to the draft-beam at *f* and to transverse beams at *g*. The rear end of the draft-beam is supported by the roll G, which also rests upon the rim A.

H is the clevis by which the harrow is drawn; *h h*, the teeth.

In guiding the harrow, the operator, by an equal pressure upon each handle, is enabled to keep it in the direction of the draft, provided the surface of the ground is uniformly level; but by relaxing the pressure on one side and increasing it on the other the weight is thrown upon the transverse beam D, thence to the rim of the harrow through roll E, causing an increased traction to the ground at a point most advantageous to deflect the harrow from the line of the draft.

Having thus fully described our said invention, the particular improvement which constitutes it, and which we claim as having been originally and first invented by us, is—

The combination of the handles or their equivalent with the transverse beams D D and rollers E E and the circular frame A, substantially as described, by which we are enabled, by regulating the pressure on the handles, to guide the harrow in the line of the draft or deflect it at pleasure.

S. J. ORANGE.
GEORGE BEIDELMAN.

Witnesses:
MICHAEL SMITH,
A. M. WHITE.